United States Patent [19]
Simmonds

[11] Patent Number: 5,182,509
[45] Date of Patent: Jan. 26, 1993

[54] CONDITIONING AND CHARGING CIRCUIT FOR NICKEL-CADMIUM BATTERIES

[75] Inventor: S. Neil Simmonds, Port Coquitlam, Canada

[73] Assignee: 372604 B.C. Ltd., Vancouver, Canada

[21] Appl. No.: 615,592

[22] Filed: Nov. 19, 1990

Related U.S. Application Data

[63] Continuation-in-part of Ser. No. 503,708, Apr. 3, 1990, abandoned, which is a continuation-in-part of Ser. No. 419,866, Oct. 11, 1989, abandoned.

[51] Int. Cl.⁵ .................................................. H02J 7/00
[52] U.S. Cl. ........................................ 320/14; 320/40; 320/48
[58] Field of Search ........................ 320/13, 14, 40, 48

[56] References Cited

U.S. PATENT DOCUMENTS

| | | | |
|---|---|---|---|
| 4,609,860 | 9/1986 | Fasen | 320/14 |
| 4,698,579 | 10/1987 | Richter et al. | 320/14 |
| 4,902,956 | 2/1990 | Sloan | 320/13 |

FOREIGN PATENT DOCUMENTS

| | | |
|---|---|---|
| 0100753 | 2/1984 | European Pat. Off. |
| 1809805 | 11/1969 | Fed. Rep. of Germany |
| 2378367 | 8/1978 | France |

OTHER PUBLICATIONS

An article from Cellular Business Magazine, Apr., 1989 titled *Battery Charging: Extending Life & Capacity* by Bob Williams.

A product brochure by Cadex Electronics, Inc. of Burnaby, British Columba, describing a Cadex Series C6000 Battery Analyzer, 1988.

Schwager, "Chargeur 'Optimal' Pour Accu 9 V 6F22," *Electronique Radio Plans*, Paris, France, Mar. 1990, pp. 34, 36.

"Charging Unit for 4 NiCd Storage Batteries," *Siemens Components XXII*, Berlin and Munich, West Germany, Aug. 1987, p. 158.

Holdinghausen, "NiCad Piggy Bank," *Elektor*, Great Britain, Dec. 1980, pp. 12–13.

*Primary Examiner*—R. J. Hickey
*Attorney, Agent, or Firm*—Seed and Berry

[57] ABSTRACT

A conditioning and charging circuit for NiCd battries includes a switch for initially connecting the battery to a discharge resistor to discharge the battery. The battery voltage is monitored during the discharge. When the battery voltage falls to predetermined value, a timer is triggered and the switch is actuated to connect the battery to a charger. The charger charges the battery until the timer times out after a predetermined period, at which point charging is terminated. The predetermined period may be fixed, or it may be a function of ambient temperature. Thus, the battery is first discharged to a predetermined voltage and then charged for a predetermined period of time.

14 Claims, 1 Drawing Sheet

CONDITIONING AND CHARGING CIRCUIT FOR NICKEL-CADMIUM BATTERIES

CROSS-REFERENCE TO RELATED APPLICATIONS

This is a continuation-in-part of Ser. No. 503,708 filed Apr. 3, 1990, now abandoned, which is a continuation-in-part of Ser. No. 419,866 filed Oct. 11, 1989 and now abandoned.

FIELD OF THE INVENTION

This invention relates to battery chargers and conditioners, and more particularly to a conditioning and charging circuit for nickel-cadmium batteries that discharges NiCd batteries to their optimum values before they are recharged to prevent the chargeability of such batteries from being impaired.

BACKGROUND ART

Rechargeable batteries are commonly used in a wide variety of consumer, industrial and business products. Common examples of such products are video cameras, cellular telephones, laptop computers, and portable drills.

Although a variety of rechargeable battery technologies have been developed, rechargeable nickel-cadmium (NiCd) batteries have several advantageous properties. Their principal advantage is that they are relatively compact and light in weight for the amount of charge they are capable of storing. They are also fairly inexpensive relative to some other high performance battery technologies. As a result of these advantageous properties, NiCd batteries have achieved widespread acceptance for such products as cellular telephones and video cameras.

Although NiCd batteries have several highly advantageous properties, they are not without certain problems. These problems are basically twofold. First, NiCd batteries may be seriously damaged by overcharging. Thus, NiCd batteries must be charged with great care. Second, NiCd batteries exhibit a property known as "memory." If a NiCd battery is repetitively charged before it has been fully discharged, it gradually looses its full ability to store charge. Thus, for example, if a NiCd battery is repetitively charged after being only half discharged, it will eventually have only half of its original charge storage capacity. The memory problem can also drastically reduce the number of charge/discharge cycles that the battery can undergo during its service life.

The problems of overcharge and memory are well known. Attempts to avoid damaging NiCd batteries by overcharging them have followed several approaches. The simplest approach has been to activate the charger through a timer so that the battery charges for a predetermined period of time. However, this approach is generally ineffective because the discharge state of the battery at the start of the charging cycle is not known. As a result, timer controlled chargers usually either insufficiently charge or overcharge NiCd batteries. Also, the use of a timer does not prevent the battery from being charged from a state well above full discharge, and thus does nothing to solve the "memory" problem described above.

A temperature sensor is also sometimes used to sense when NiCd battery is fully charged. When a NiCd battery reaches full charge, the chemical process that stores electricity ends and electrolysis begins. Heat is generated by an increase in the battery's internal pressure caused by gases generated during electrolysis. Unfortunately, thermal inertia delays the migration of heat to the heat sensor. By the time a temperature increase is detected, the battery's cells may already be damaged by excessive gas pressure.

Other chargers for NiCd batteries attempt to solve the problem of battery overcharging by sensing the battery voltage. When the battery voltage reach a predetermined value, the charger either switches to a trickle charge or charging is terminated. The principal disadvantage of this approach is the difficulty of determining and setting the voltage at which normal charging is to terminate, particularly if the charger is to be used with batteries having different battery voltages.

A more complex approach to the overcharging problem has been developed, known as the "negative slope" technique. A battery charger employing the negative slope technique is commercially available from Cadex Electronics Inc. of Burnaby, British Columbia, Canada. This approach examines the battery voltage history to determine when the battery is fully charged. It is well known that the voltage of a NiCd battery gradually increases as it is being charged until it is fully charged. If the battery is then overcharged, the battery voltage is gradually reduced. Negative slope chargers detect the peak of the battery voltage and then either switches the charger off or to a trickle charge mode.

Most NiCd batteries have not been very effective at ambient temperatures above 45° C. However, a line of NiCd batteries having an extended temperature range has been developed recently. These extended range batteries have presented still another problem in charging NiCd batteries because their proper charging times vary with ambient temperature.

One technique for varying the charging time of NiCd batteries as a function of temperature is described in U.S. Pat. No. 4,609,861 to Inaniwa et al. The Inaniwa et al patent discloses a battery charger in which a battery is first charged at a constant current until a predetermined state of charge is achieved. The battery is then charged at a constant voltage for a period of time which may be a function of the voltage of the battery. Specifically, a heat-sensitive resistor senses the temperature of the battery being charged and generates a corresponding reference voltage. The reference voltage is then used to control the duration of a timer circuit which, in turn, controls the duration of the charge period.

Some negative slope battery chargers, such as the charger sold by Cadex, also addresses the "memory" problem by fully discharging the battery prior to starting the charging cycle.

Although negative slope battery chargers do solve the major problems associated with NiCd batteries, they do so in a relatively expensive manner. Such chargers must be relatively sophisticated to record the battery voltage and then detect the voltage peak. As a result of this sophistication, negative slope chargers are relatively expensive, thus drastically limiting the market for such chargers.

Another approach to solving the problem of "memory" in NiCd batteries is described in U.S. Pat. No. 4,342,954 to Griffith. The Griffith patent discloses a battery charger for NiCd batteries in which the battery is discharged to a predetermined voltage prior to starting a charging period. In theory, the NiCd battery is then in a known, relatively low state of discharge.

The approach disclosed in the Griffith patent goes a long way toward solving the problem of "memory" in NiCd batteries in most cases. However, there are times when the optimum state of discharge of a NiCd battery does not occur at a fixed voltage. In other words, the voltage of a NiCd battery when it is discharged to an optimum value may vary under certain conditions. Griffith's approach thus sometimes fails to place NiCd batteries in the optimum state of discharge prior to starting a charging cycle.

DISCLOSURE OF THE INVENTION

The principal object of this invention is to provide a relatively simple and inexpensive charger for NiCd batteries that places NiCd batteries in their optimum state of discharge prior to starting a charging cycle.

It is another object of the invention to provide an improved charger for NiCd batteries that can be easily used with batteries having a wide variety of battery voltages.

It is another object of the invention to provide an improved charger for NiCd batteries that can simultaneously charge multiple batteries without adversely affecting the performance of such charger.

These and other objects of the invention are provided by a battery conditioning and charging system that first discharges the battery to a predetermined discharge state and then starts a battery charging cycle. The battery discharge system preferably includes a load resistor, a switch connecting the load resistor across a battery until it receives a disconnect signal thereby discharging the battery, and a sensing circuit for generating the disconnect signal when the battery has been discharged to an optimum state. As is well known in the art, when a NiCd battery is discharged at a constant rate, its voltage decreases at a gradual rate until it is almost fully discharged. As the battery is further discharged, the battery voltage decreases at a substantially faster rate. The sensing circuit detects the predetermined discharge state by sensing when the rate at which the battery voltage decreases exceeds a predetermined value. The sensing circuit preferably includes a differentiator connected across the battery to monitor the rate at which the battery voltage decreases, and a comparator for generating the disconnect signal when the rate at which the battery voltage decreases reaches a predetermined value. After the battery has been discharged to this optimum state, a charging cycle may be initiated.

BEST MODE FOR CARRYING OUT THE INVENTION

Figure 1:
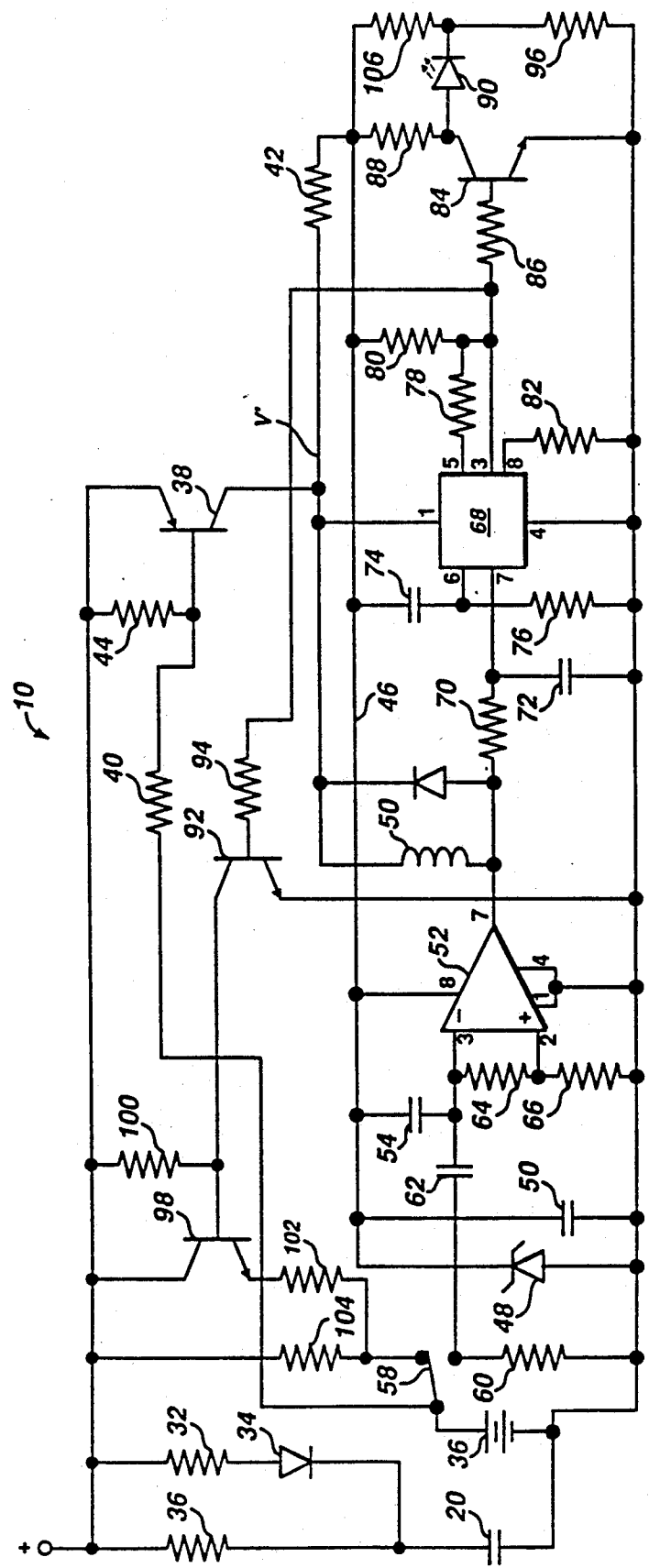
FIG. 1 is a schematic of one embodiment of the inventive conditioning and charging system for NiCd batteries.

With reference to FIG. 1, one embodiment of the inventive charging and conditioning system 10 is powered by an AC adapter 12 of conventional design. The adapter 12 is plugged into a 120 V A.C. outlet, and it generates a D.C. voltage having a predetermined magnitude. In the embodiment shown, the adapter 12 generates an output of 12 volts.

The system 10 is adapted to charge two NiCd batteries at the same time. One of these batteries 20 is trickle charged in a conventional manner through resistor 30. When the battery 20 is being charged, it also draws current through current limiting resistor 32 and light emitting diode (LED) 34 to provide a visual indication that the battery 20 is being trickle charged.

The other battery 36 is charged using the inventive circuity of the charging and conditioning system 10. The system 10 is illustrated in FIG. 1 in the state that it is in before power is applied by the AC adapter 12. When power is initially applied to the system by the AC adapter 12, the battery 36 pulls current through the base-emitter junction of transistor 38 and resistor 40 thereby turning transistor 38 on. Transistor 38 then applies power to the remainder of the system 10, either directly or through resistor 42. If power is applied to the system 10 prior to its connection to the battery 36, then resistor 44 holds transistor 38 at cutoff until the battery 36 is connected. Thus, regardless of whether the battery 36 is connected before or after power is applied to the system, the transistor 38 turns on when power is applied and the battery 36 is connected.

When transistor 38 turns on, power is applied to a power line 46 through resistor 42 thereby applying power to a zener diode 48 which regulates the voltage of the power line 46. Capacitor 50 functions as a filter capacitor to attenuate high frequency noise on the power line 46. The inverting input of a comparator 52 receives a power-up reset through a capacitor 54. When transistor 38 turns on, the negative input of the comparator 52 is pulled high through capacitor 54, thereby causing the comparator 52 to output zero volts. The comparator 52 then draws current through a relay coil 56.

The flow of current through the relay coil 56 switches a relay contact 58 to discharge the battery 36 through a discharge resistor 60. The discharge resistor 60 has a relatively low resistance and a relatively high power rating so that it can discharge the battery 36 fairly rapidly.

During the discharge of the battery 36, the rate of change of the battery voltage is monitored by the comparator 52 through a differentiator circuit formed by a capacitor 62 and a pair of voltage divider resistors 64, 66.

During most of the time that the battery 36 is being discharged, the voltage across the battery 36 is relatively constant. However, when the battery 36 approaches full discharge, the voltage across the battery 36 starts to drop fairly rapidly with time. At this point, which may not always be a constant or predetermined voltage, the battery 36 has been discharged to its optimum value.

As mentioned above, the battery voltage is differentiated by capacitor 62 in combination with resistors 64, 66. As a result, when the battery voltages decreases at a relatively rapid rate, a negative voltage is applied to the inverting input of the comparator 54. A negative voltage is also applied to the non-inverting input of the comparator 54. However, the resistors 64, 66 form a voltage divider so that the voltage applied to the non-inverting input of the comparator will always less negative than the voltage applied to the inverting input. When the rate of voltage drop reaches a predetermined value, the output of the comparator 54 outputs a voltage substantially equal to the voltage on the power line 46. This change in the output of comparator 54 has two effects. First, it terminates the flow of current through the relay coil 56 thereby switching the relay contact 58 back to the position illustrated in FIG. 1. Second, it triggers a timer circuit 68 through resistor 70 to control the duration of a changing phase, as explained in detail below.

It is important to appreciate that the inventive discharge sensing system is capable of operating while it is simultaneously connected to several batteries. It will also operate even if there are significant variations in the voltage at which the battery voltage rapidly decreases. As a result, the inventive system may be used with a wide variety of NiCd batteries.

The timer circuit 68 is of the conventional variety, such as a model XR-2243 Long Range Timer sold by Exar Corporation. As mentioned above, the timer circuit 68 is triggered through resistor 70 after a short delay while capacitor 72 charges through resistor 70. This delay allows the relay contact 46 to switch before charging power is applied to the battery 36 as described below. When the timer circuit 68 is triggered, its output on pin 3 goes low for a period determined by the product of 1024, the capacitance of capacitor 74 and the resistance of resistor 76. At the end of this predetermined period, the output of the timer circuit 68 goes high until the timer circuit 68 is once again triggered. Resistor 78 is connected to a reset input so that internal counters are reset at the end of each charge cycle. Resistor 80 and resistor 82 are used as bias or pull-up resistors for the output of the timer circuit 68 and an internal time base.

The low output by the timer circuit 68 during the charge cycle performs two functions. First, it turns off transistor 84 through resistor 86 thereby allowing current to flow through resistor 88, dual colored LED 90 and resistor 96, thereby causing the LED to glow red to indicate that the battery 36 is being charged. The LED 90 allows current to flow in either direction. The LED 90 glows red when current flows from left-to-right, as shown in FIG. 1, and green when current flows in the opposite direction.

The second effect of the low output from the timer circuit 68 is the turning off of transistor 92 through resistor 94. Transistor 92 then releases the base of transistor 98 to allow transistor 98 to turn on through resistor 100. Transistor 98 then applies a charging current to the battery 36 through resistor 102. Resistor 104 is used to provide a trickle charge to the battery 36 to maintain it at full charge after the charging cycle has been completed.

The battery 36 is charged though transistor 98 and resistor 102 until the timer circuit 68 times out. The output of the timer circuit 68 then goes high. The high at the output of the timer circuit 68 performs two functions. First, it turns transistor 84 on through resistor 86 thereby drawing current through resistor 106 and dual colored LED 90. The LED 90 then glows green to indicate that the charging cycle has been completed. Second, it turns transistor 92 on through resistor 94 thereby pulling the collector of transistor 92 low. The low on the collector of transistor 92 back biases the base-emitter junction of transistor 98 since the emitter of transistor 98 receives the battery voltage of the now fully charged battery 36. Transistor 98 then turns off to terminate the charging of the battery 36. The battery 36 then continues to be trickle charged through resistor 30. As long as a power-up reset signal is not applied to the comparator 54 through capacitor 54, the relay switch 58 will keep the battery 36 disconnected from the discharge resistor 60.

The embodiment explained above uses a timer circuit 68 having fixed capacitor 74 and resistor 76, thereby providing a fixed charging time. As explained above, the proper charge time for newly developed extended temperature range NiCd batteries is a function of their temperature. The charge time selected by the timer circuit 68 can be varied as a function of ambient temperature by substituting a conventional resistive temperature device ("RTD") for the resistor 76 controlling the duration of the timer circuit 68. Conventional RTD's have a negative temperature coefficient so that their resistance decreases as their temperature increases. As a result, an increase in ambient temperature reduces the charging time of the NiCd battery, and a decrease in ambient temperature increases the charging time of the NiCd battery. The proper value of the RTD can be easily selected to achieve the desired charging time as a function of temperature.

I claim:

1. A system for conditioning and charging a battery, comprising:
   a load resistor;
   a charging circuit providing a DC current;
   sensor means operatively connected to said battery for sensing the discharge state of said battery, said sensor generating an initiate signal when the rate at which the voltage of said battery decreases during discharge exceeds a predetermined value; and
   a control switch operatively connected to said battery, said charging circuit, said load resistor, and said sensor means, said control switch connecting said load resistor to said battery until said sensor means generates said initiate signal thereby discharging said battery, said control switch thereafter connecting said battery to said charge circuit in response to said initiate signal whereby said conditioning and charging system discharges said battery to a predetermined discharge state and then charges said battery.

2. The conditioning and charging system of claim 1, wherein said sensor means comprises:
   a differentiator connected to said battery, said differentiator generating a discharge rate signal having a magnitude that is proportional to the rate at which the voltage of said battery decreases;
   a reference voltage generator outputting a reference voltage having a predetermined value; and
   a comparator operatively connected to said differentiator and to said reference voltage generator, said comparator having an output that changes state to generate said initiate signal when the discharge rate signal exceeds the reference voltage output by said reference voltage generator.

3. The conditioning and charging system of claim 2 further including a battery sensor generating an actuating signal when said battery is connected to said system, and a capacitor applying said actuating signal to an input of said comparator that causes the output of said comparator to be at a voltage opposite to voltage of said initiate signal when said actuating signal is generated thereby insuring that said initiate signal is not generated when said battery is initially connected to said conditioning and charging system.

4. The conditioning and charging system of claim 1, further comprising:
   a battery sensor generating an actuating signal when said battery is connected to said system; and a power supply switch being turned on to apply power to said timer, sensor and control switch in response to said actuating signal whereby said timer, sensor and control switch are not functional until said battery is connected to said system.

5. The conditioning and charging system of claim 1 further including a timer generating an enable signal for a predetermined period after being triggered by said initiate signal, and means for disabling said charge circuit when upon termination of said enable signal so that said battery is charged for a predetermined period after being discharged to said predetermined state.

6. The conditioning and charging system of claim 5, further including a trickle charger applying a trickle charge to said battery at the termination of said enable signal.

7. The conditioning and charging system of claim 5, wherein the duration of said enable signal is an inverse function of ambient temperature.

8. The conditioning and charging system of claim 5, wherein said timer includes a semi-conductor timer circuit generating said enable signal as a function of the product of the capacitance of a capacitor and the resistance of a resistive temperature device.

9. The conditioning and charging system of claim 8, wherein the resistance of said resistive temperature device is an inverse function of ambient temperature.

10. The conditioning and charging system of claim 1, wherein said system further includes a battery sensor generating an actuating signal when said battery is connected to said system, and wherein said control switch connects said battery to said discharge resistor automatically responsive to the start of said actuating signal.

11. The conditioning and charging system of claim 1, wherein said battery is a nickle-cadmium battery.

12. A method of charging a NiCd battery to minimize the detrimental effects of overcharging and memory, said method comprising:
monitoring the voltage from said battery;
discharging said battery until the rate at which the voltage from said battery decreases exceeds a predetermined value; and
charging said battery.

13. The method of claim 12 wherein said battery is charged for a predetermined period of time after said battery has been discharged.

14. The method of claim 13 wherein the predetermined period during which said battery is charged is a function of ambient temperature.

* * * * *